United States Patent
Yang et al.

(10) Patent No.: US 10,091,849 B2
(45) Date of Patent: Oct. 2, 2018

(54) HYBRID DIMMING FOR LIGHTING CIRCUITS

(71) Applicant: FAIRCHILD KOREA SEMICONDUCTOR LTD., Bucheon (KR)

(72) Inventors: Seunguk Yang, Anyang (KR); Hyunchul Eum, Seoul (KR); Eungwoo Lee, Seoul (KR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 0 days.

(21) Appl. No.: 15/655,025

(22) Filed: Jul. 20, 2017

(65) Prior Publication Data

US 2018/0054865 A1    Feb. 22, 2018

Related U.S. Application Data

(60) Provisional application No. 62/377,817, filed on Aug. 22, 2016.

(51) Int. Cl.
*H05B 37/02* (2006.01)
*H05B 33/08* (2006.01)

(52) U.S. Cl.
CPC ..... *H05B 33/0845* (2013.01); *H05B 33/0812* (2013.01); *H05B 33/0815* (2013.01); *H05B 33/0818* (2013.01)

(58) Field of Classification Search
CPC ............ H05B 33/0815; H05B 33/0845; H05B 33/0887

USPC ......................................... 315/291, 297, 307
See application file for complete search history.

(56) References Cited

U.S. PATENT DOCUMENTS

| | | | |
|---|---|---|---|
| 8,810,156 B2 | 8/2014 | Brassfield et al. | |
| 2010/0052552 A1* | 3/2010 | Kimura | H05B 33/0815 315/185 R |
| 2011/0006691 A1 | 1/2011 | Blaha et al. | |
| 2011/0292704 A1* | 12/2011 | Makino | H02M 1/4208 363/126 |
| 2012/0181950 A1* | 7/2012 | Yu | H05B 33/0815 315/294 |
| 2012/0242246 A1* | 9/2012 | Naruo | H05B 33/0818 315/283 |
| 2013/0099694 A1 | 4/2013 | Naruo et al. | |
| 2013/0320856 A1* | 12/2013 | Lin | H05B 33/089 315/119 |
| 2014/0035486 A1* | 2/2014 | Ando | H05B 33/08 315/307 |
| 2014/0062319 A1 | 3/2014 | Huang et al. | |
| 2015/0084541 A1* | 3/2015 | Jung | H05B 33/0812 315/291 |

(Continued)

*Primary Examiner* — Tung X Le
(74) *Attorney, Agent, or Firm* — Dickinson Wright PLLC

(57) ABSTRACT

A lighting circuit includes a light emitting diode (LED), a transistor that controls a current through the LED, and a controller integrated circuit (IC) that controls the transistor to vary a brightness of the LED. The controller IC has a dimming pin that receives a hybrid dimming signal from a dimming input circuit. The dimming input circuit receives pulse width modulation (PWM) dimming signals and generates the hybrid dimming signal as a PWM dimming signal, an analog dimming signal, or both depending on the received PWM dimming signals.

18 Claims, 11 Drawing Sheets

(56) References Cited

U.S. PATENT DOCUMENTS

| | | |
|---|---|---|
| 2015/0102742 A1 | 4/2015 | Deng et al. |
| 2015/0271893 A1* | 9/2015 | Lee .................... H05B 33/0887 |
| | | 315/186 |
| 2015/0312982 A1 | 10/2015 | Melanson |
| 2016/0050733 A1 | 2/2016 | Joo et al. |
| 2017/0196062 A1 | 7/2017 | Wang et al. |
| 2017/0231045 A1* | 8/2017 | Hu ..................... H05B 33/0845 |
| 2017/0236472 A1* | 8/2017 | Yonemaru .............. G09G 3/342 |
| | | 345/690 |
| 2017/0238385 A1 | 8/2017 | Sasaki et al. |

* cited by examiner

HYBRID DIMMING FOR LIGHTING CIRCUITS

CROSS-REFERENCE TO RELATED APPLICATION

This application claims the benefit of U.S. Provisional Application No. 62/377,817, filed on Aug. 22, 2016, which is incorporated herein by reference in its entirety.

BACKGROUND OF THE INVENTION

1. Field of the Invention

The present invention relates generally to electrical circuits, and more particularly but not exclusively to lighting circuits.

2. Description of the Background Art

A light emitting diode (LED) may be used in various lighting applications. For example, one or more LEDs may provide lighting by driving the LEDs using a transistor. The LED control circuit may include a controller integrated circuit (IC) to control the switching operation of the transistor by hysteretic control. The controller IC may include a plurality of pins for driving the transistor, receiving a dimming signal, etc. A dimming signal is an external signal for adjusting the brightness of the LEDs. The dimming signal may be an analog dimming signal or a PWM dimming signal. Hybrid dimming, which involves PWM and analog dimming, may be employed to achieve low dim levels. Hybrid dimming typically requires two pins for dimming, one for receiving a PWM dimming signal and another for receiving an analog dimming signal.

SUMMARY

In one embodiment, a lighting circuit includes a light emitting diode (LED), a transistor that controls a current through the LED, and a controller integrated circuit (IC) that controls the transistor to vary a brightness of the LED. The controller IC has a dimming pin that receives a hybrid dimming signal from a dimming input circuit. The dimming input circuit receives pulse width modulation (PWM) dimming signals and generates the hybrid dimming signal as a PWM dimming signal, an analog dimming signal, or both depending on the received PWM dimming signals.

These and other features of the present invention will be readily apparent to persons of ordinary skill in the art upon reading the entirety of this disclosure, which includes the accompanying drawings and claims.

Figure 1:
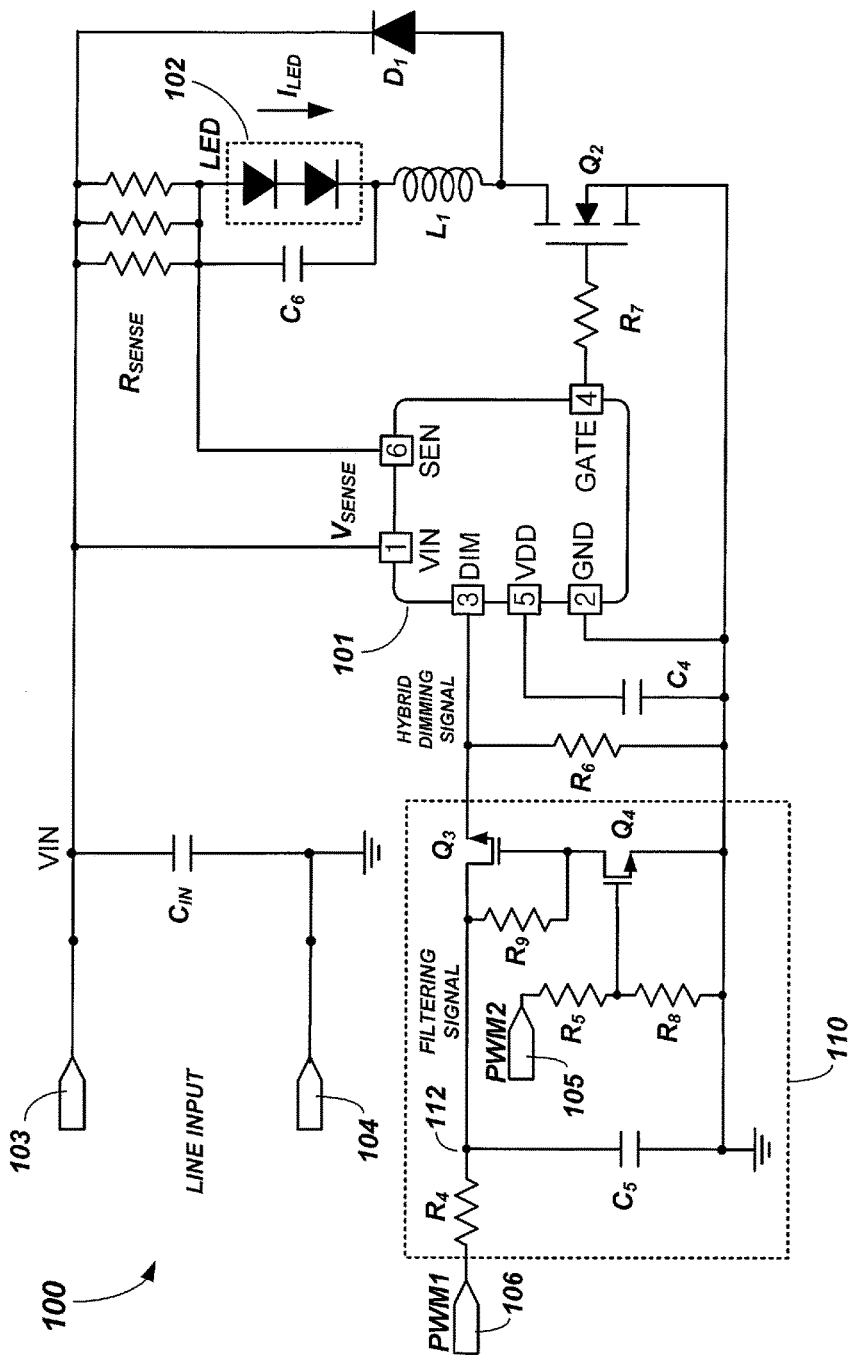
FIG. 1 shows a schematic diagram of a lighting circuit in accordance with an embodiment of the present invention.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

For ease of reading, subscripts and superscripts that appear in the drawings are formatted below as normal fonts. For example, a signal that is labeled in the drawings as $V_{EXAMPLE}$ is simply written below as VEXAMPLE.

FIG. 1 shows a schematic diagram of a lighting circuit 100 in accordance with an embodiment of the present invention. In the example of FIG. 1, the lighting circuit 100 receives a line input across the nodes 103 and 104. The line input may be a high DC voltage (e.g., 60 VDC or less), such as a rectified AC line voltage from a rectifier. The input capacitor CIN provides filtering and bulk capacitance to generate an input voltage VIN.

In the example FIG. 1, the LEDs 102 may comprise one or more LEDs that are connected in series. A sense resistor RSENSE, which may comprise one or more resistors, connects the input voltage VIN to an anode end of the LEDs 102. A capacitor C6 is across the LEDs 102. A first end of an inductor L1 is connected to a cathode end of the LEDs 102, and a second end of the inductor L1 is connected to a drain of a transistor Q2, which may be a metal oxide semiconductor field effect transistor (MOSFET). A cathode of a diode D1 is connected to the node 103 and an anode of the diode D1 is connected to the drain of the transistor Q2. The source of the transistor Q2 is connected to ground.

In the example of FIG. 1, a lighting controller integrated circuit (IC) 101, or a discrete controller, controls a switching operation of the transistor Q2. In the example of FIG. 1, the controller IC 101 comprises a plurality of pins including an input voltage pin 1 for receiving the input voltage VIN for generating an internal supply voltage, a pin 2 for receiving a ground reference, a dimming (DIM) pin 3 for receiving a dimming signal, a gate pin 4 for outputting a drive signal to the gate of the transistor Q2 by way of a resistor R7, a pin 5 for the supply voltage VDD of the controller IC 101, and a sense (SEN) pin 6 for receiving a sense signal indicative of the current ILED flowing through the LEDs 102. The pin 5 may be connected to ground by way of a capacitor C4 for filtering. An input resistor R6 has a first end that is connected to the dimming pin 3 and a second end that is connected to ground.

In the example of FIG. 1, the controller IC 101 is configured to control the switching operation of the transistor Q2 to control the current ILED through the LEDs 102. In the example of FIG. 1, the sense signal indicative of the current ILED is a high-side sense voltage VSENSE developed by the current ILED on the sense resistor RSENSE. The controller IC 101 detects the sense voltage VSENSE across the input voltage pin 1 and the sense pin 6. The controller IC 101 controls the switching operation of the transistor Q2 by hysteretic control. The controller IC 101 asserts the drive signal on the gate pin 4 to turn on the transistor Q2 when the sense voltage VSENSE becomes lower than a low reference threshold voltage, and de-asserts the drive signal on the gate pin 4 to turn off the transistor Q2 when the sense voltage VSENSE becomes greater than a high reference threshold voltage.

The conduction of the transistor Q2, and thus the brightness of the LEDs 102, may be controlled by an external dimming signal received on the dimming pin 3 of the controller IC 101. In the example of FIG. 1, the lighting circuit 100 includes a dimming input circuit 110 for generating a hybrid dimming signal at the dimming pin 3. The hybrid dimming signal generated by the dimming input circuit 110 is hybrid in that it may be a PWM dimming signal, an analog dimming signal, or both PWM and analog dimming signals. As its name implies, a PWM dimming signal comprises a series of pulse-width modulated pulses that go high and low for turning the transistor Q2 on and off. In contrast, an analog dimming signal comprises an analog, i.e., continuous, signal for controlling the conduction of the transistor Q2.

In one embodiment, the dimming input circuit 110 is configured to receive a first PWM dimming signal PWM1 and a second PWM dimming signal PMW2, and to generate a hybrid dimming signal based on the first and second PWM dimming signals. The dimming circuit 110 is configured to generate the hybrid dimming signal as a PWM dimming signal when the dimming signal PWM2 alternates between a first logic level (e.g., high) and a second logic level (e.g., low), and to generate the hybrid dimming signal as an analog dimming signal when the dimming signal PWM2 is maintained at the second logic level (e.g., low). This allows an external circuit to provide a hybrid dimming signal at the dimming pin 3 of the controller IC 101 by providing the dimming signals PWM1 and PWM2.

In the example of FIG. 1, the dimming input circuit 110 comprises a node 106 for receiving the dimming signal PWM1 and a node 105 for receiving the dimming signal PWM2. A low pass filter comprising a resistor R4 and a capacitor C5 low-pass filters the dimming signal PWM1 to generate a filtering signal at the output of the low-pass filter at a node 112. A first end of the resistor R4 is connected to the node 106 to receive the dimming signal PWM1, and a second end of the resistor R4 is connected to the node 112. A first end of the capacitor C5 is connected to the node 112, and a second end of the capacitor C5 is connected to ground. The dimming signal PWM1 may be generated at high frequency to minimize the size of the components of the low-pass filter.

In the example of FIG. 1, the passage of the filtering signal to the dimming pin 3 of the controller IC 101 is controlled by a transistor Q3, which in turn is controlled by a transistor Q4. The dimming signal PWM2 is received at the node 105, and is resistive-divided by the resistors R5 and R8. The transistor Q4 has a gate that is connected to the resistor R8, a source that is connected to ground, and a drain that is connected to the gate of the transistor Q3. A first end of a resistor R9 is connected to a drain of the transistor Q3, and a second end of the resistor R9 is connected to the gate of the transistor Q3. A source of the transistor Q3 is connected to the dimming pin 3 of the controller IC 101.

When the dimming signal PWM2 is at a low level, the transistor Q4 is off, and current does not flow through the transistor Q4 so that the transistor Q3 is on. When the transistor Q3 is on, the filtering signal at the node 112 propagates to the dimming pin 3 through the transistor Q3. That is, the transistor Q3 allows the filtering signal to reach the dimming pin 3 when the dimming signal PWM2 is low.

When the dimming signal PWM2 is at a high level, the transistor Q4 is on, and current flows through the transistor Q4 to turn the transistor Q3 off. When the transistor Q3 is off, the filtering signal at the node 112 is cut off from the dimming pin 3. That is, in the example of FIG. 1, the transistor Q3 cuts off the filtering signal from the dimming pin 3 when the dimming signal PWM2 is high.

By turning the transistor Q3 on and off using the dimming signal PWM2, the hybrid dimming signal at the dimming pin 3 would pulse in accordance with PWM dimming. By maintaining the transistor Q3 on using the dimming signal PWM2, the hybrid dimming signal at the dimming pin 3 would be an analog signal with a value dependent on the dimming signal PWM1. That is, when the transistor Q3 is on, the filtering signal is passed to the dimming pin 3, and the filtering signal can be adjusted based on the dimming signal PWM1 for analog dimming.

Figure 2:
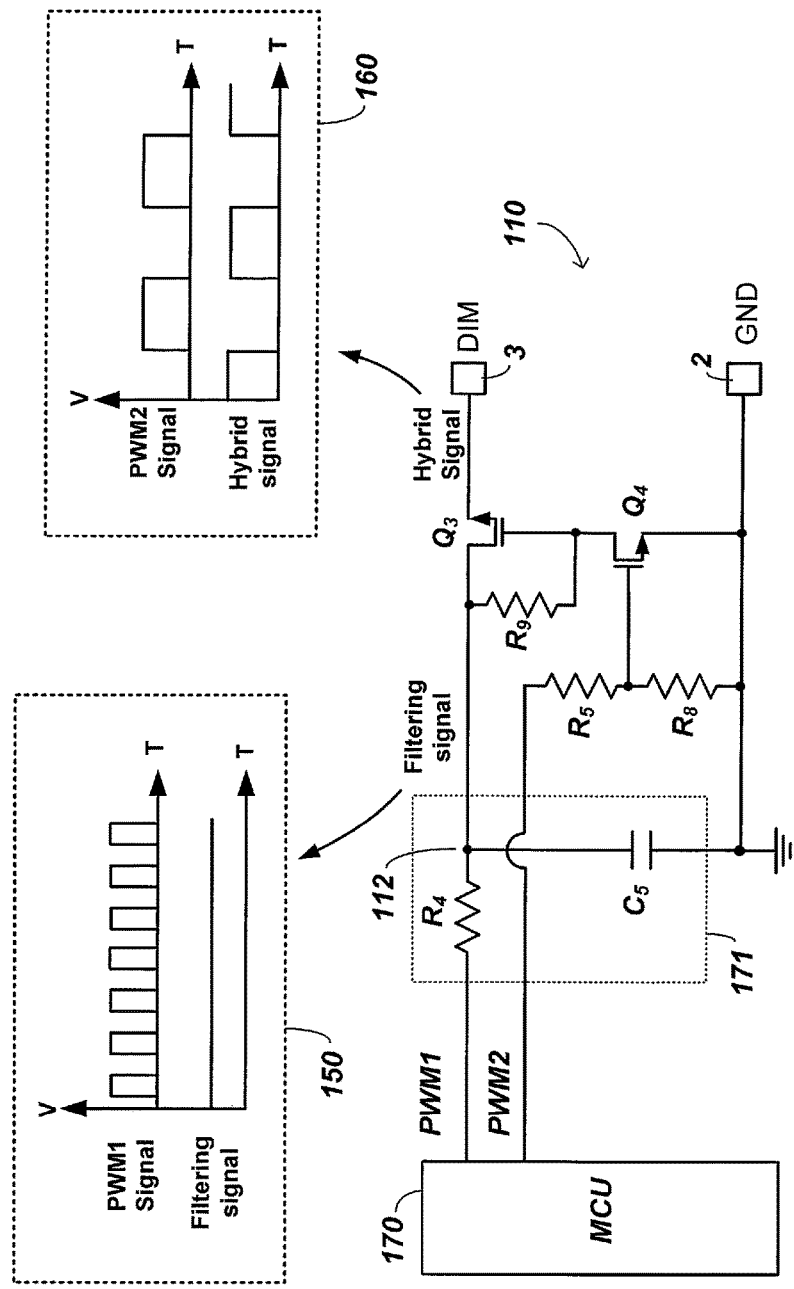
FIG. 2 shows a dimming input circuit of the lighting circuit of FIG. 1 receiving PWM dimming signals from a microcontroller in accordance with an embodiment of the present invention.

FIG. 2 shows the dimming input circuit 110 receiving PWM dimming signals from a microcontroller (MCU) 170 in accordance with an embodiment of the present invention. In the example of FIG. 2, the MCU 170 is an external circuit that generates the PWM dimming signals PWM1 and PWM2. In other embodiments, an external circuit other than an MCU generates the PWM dimming signals.

In the example of FIG. 2, the MCU 170 provides the dimming signal PWM1 to an end of the resistor R4, and provides the dimming signal PWM2 to an end of the resistor R5. The low pass filter 171 formed by the resistor R4 and the capacitor C5 low-pass filters the dimming signal PWM1 to generate the filtering signal at the node 112. FIG. 2 graphically shows the filtering signal in relation to the dimming signal PWM1 (see 150). The filtering signal is a DC output that may be used as an analog dimming signal at the dimming pin 3 (DIM pin) of the controller IC 101 by turning on the transistor Q3 using the dimming signal PWM2. The peak of the analog dimming signal is controlled by the dimming signal PWM1.

FIG. 2 also graphically shows the hybrid dimming signal at the dimming pin 3 in relation to the dimming signal PWM2 (see 160). When the dimming signal PWM2 is at a low level, the transistor Q3 passes the filtering signal to the dimming pin 3 so that the hybrid dimming signal is the filtering signal at high level (by suitably providing the dimming signal PWM1). When the dimming signal PWM2 is at a high level, the transistor Q3 is cut off from the dimming pin 3, so that dimming pin 3 is pulled to ground (see FIG. 1, input resistor R6), and the hybrid dimming signal is at a low level.

Figure 3:
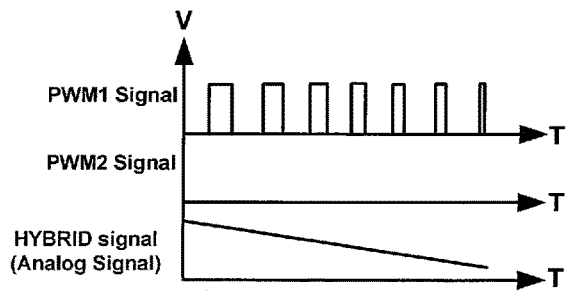
FIGS. 3-5 show waveforms of signals of a dimming input circuit in accordance with an embodiment of the present invention.
Figure 4:
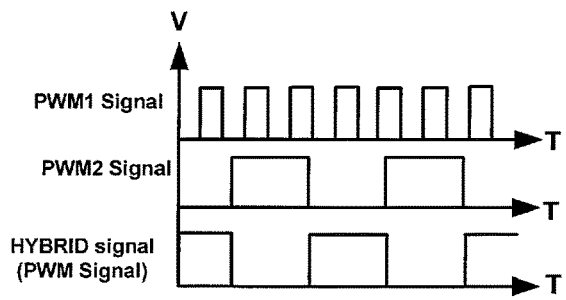
Figure 5:
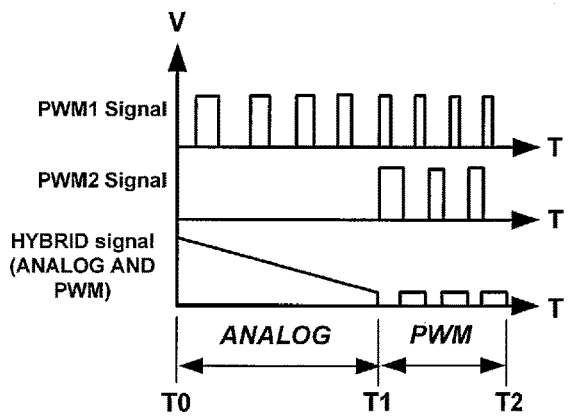

FIGS. 3-5 show waveforms of signals of the dimming input circuit 110 in accordance with an embodiment of the present invention. FIGS. 3-5 show, from top to bottom, the dimming signal PWM1, the dimming signal PWM2, and the hybrid dimming signal at the dimming pin 3 of the controller IC 101. As shown in FIG. 3, when the dimming signal PWM2 is maintained at a low level, the hybrid dimming signal behaves as an analog dimming signal because the filtering signal, which is based on the dimming signal PWM1, is propagated to the dimming pin 3. As shown in FIG. 4, when the dimming signal PWM2 alternates at a low level and at a high level, the hybrid dimming signal also alternates in, complementary manner, at a low level and at a high level and thus behaves as a PWM dimming signal. As shown in FIG. 5, when the dimming signal PWM2 is maintained at a low level from a period T0-T1 and then pulsed at a low level and at a high level from a period T1-T2, the hybrid dimming signal behaves as an analog dimming signal during the period T0-T1 and as a PWM dimming signal during the period T1-T2.

Figure 6:
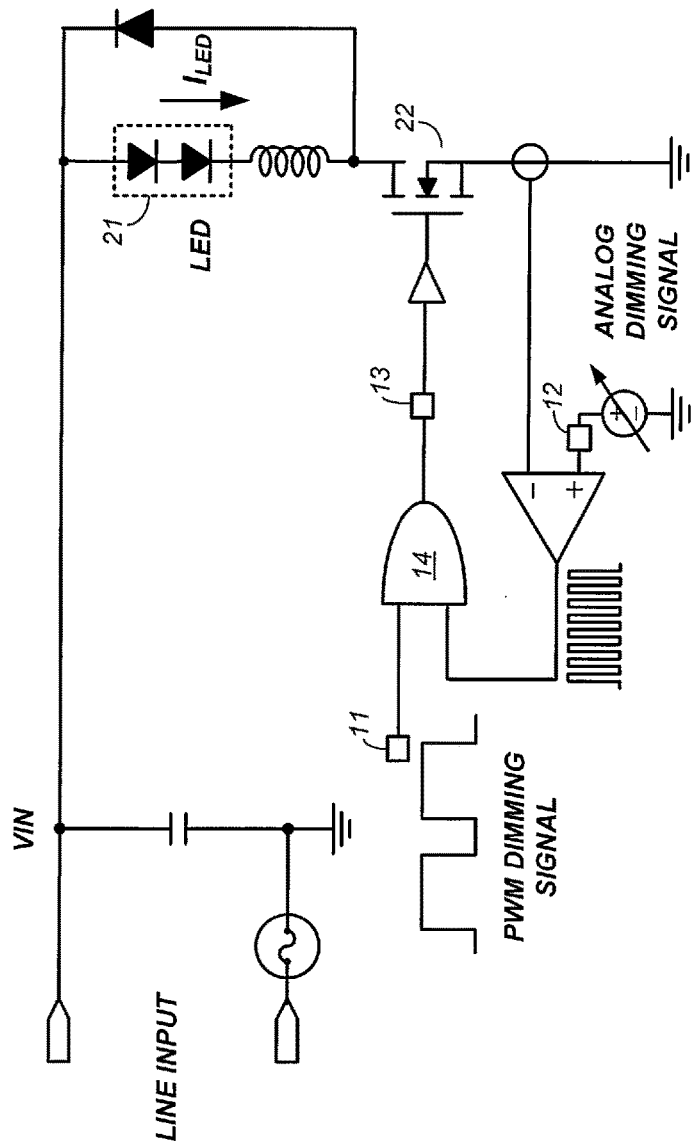
FIG. 6 shows a schematic diagram of an example lighting circuit.

An aspect of the present invention relating to generation of internal low and high reference thresholds for controlling switching of the transistor Q2 for hybrid dimming is now explained beginning with FIG. 6.

FIG. 6 shows a schematic diagram of an example lighting circuit. The lighting circuit receives a line input voltage to generate an input voltage VIN that is provided to an anode end of the LEDs 21. The transistor 22 is turned on and off to control the LED current through the LEDs 21. To allow for hybrid dimming, the lighting circuit receives a PWM dimming signal at a node 11 and an analog dimming signal at a node 12. An and gate 14 allows the PWM dimming signal and a drive signal having a value corresponding to the analog dimming signal to be applied to control the LED current by driving the gate of the transistor 22. When a controller integrated circuit (IC) is used to control the switching operation of the transistor 22, the nodes 11-13 are separate pins of the IC. Accordingly, the lighting circuit of FIG. 6 requires at least two pins and the and gate 14 to control the brightness of the LEDs 21 by hybrid dimming control.

Figure 7:
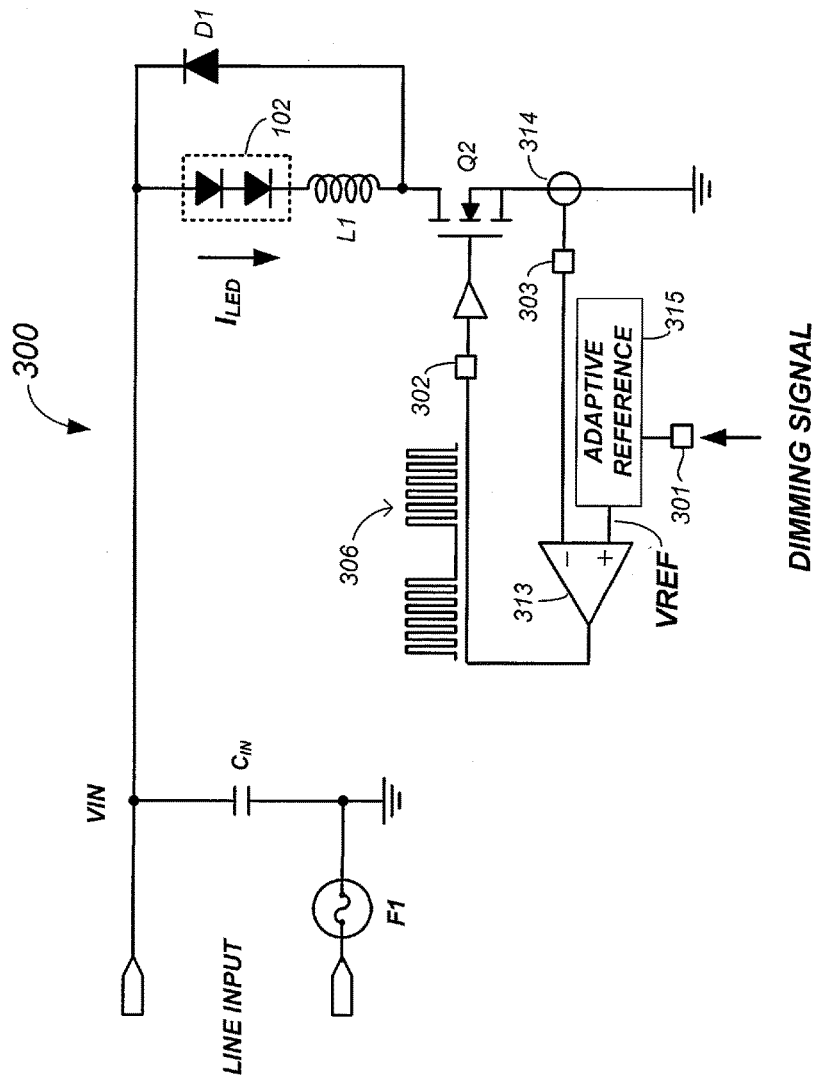
FIG. 7 shows a schematic diagram of a lighting circuit in accordance with an embodiment of the present invention.

FIG. 7 shows a schematic diagram of a lighting circuit 300 in accordance with an embodiment of the present invention. In the example of FIG. 7, the lighting circuit 300 receives a line input voltage, which is filtered by a capacitor CIN to generate an input voltage VIN. A fuse F1 protects the lighting circuit 300 against fault conditions.

In the example of FIG. 7, the one or more LEDs 102 are connected in series and have an anode end that is connected to the input voltage VIN and a cathode end that is connected to a first end of the inductor L1. A second end of the inductor L1 is connected to the drain of a transistor Q2. The diode D1 has a cathode end that is connected to the input voltage VIN and an anode end that is connected to the drain of the transistor Q2. A source of the transistor Q2 is connected to ground by way of a low-side current sense circuit 314. The low-side current sense circuit 314 generates a sense signal that is indicative of the LED current ILED that flows through the LEDs 102 when the transistor Q2 is on. In one embodiment, the sense signal is a sense voltage that is compared by a comparator 313 to an internal reference voltage VREF that is generated by an adaptive reference circuit 315. The comparator 313 performs hysteretic control by comparing the sense voltage to the reference voltage VREF to generate a gate drive signal 306 that controls the conduction of the transistor Q2. The comparator 313 asserts the gate drive signal 306 to turn on the transistor Q2 when the sense voltage is less than the reference voltage VREF, and de-asserts the gate drive signal 106 to turn off the transistor Q2 when the sense voltage is greater than the reference voltage VREF. The adaptive reference circuit 315 generates the reference voltage VREF with hysteresis.

In the example of FIG. 7, the dimming signal is received at a node 301, the drive signal 306 is output at a node 302, and the sense voltage is received at a node 303. When the lighting circuit 101 is implemented with a lighting controller IC, the nodes 301-303 are separate pins of the IC. As a particular example, the nodes 301-303 may correspond to the dimming pin 3, the gate pin 4, and the sense pin 6, respectively, of the controller IC 101. In one embodiment, the dimming signal received at the node 301 is a hybrid dimming signal, as in previously described embodiments.

In one embodiment, the adaptive reference circuit 315 is configured to receive a dimming signal, and to generate the reference signal that follows the dimming signal. That is, the waveforms of the dimming signal voltage and the reference voltage VREF may have the same shape. The adaptive reference circuit 315 generates the reference signal as an analog reference signal when the dimming signal is an analog dimming signal, and generates the reference signal as a PWM dimming signal comprising a series of pulse-width modulated pulses when the dimming signal is a PWM dimming signal. This allows the lighting circuit 300 to have hybrid dimming control with a single IC pin for receiving the dimming signal, and not necessarily needing an and gate for PWM and analog dimming signals.

Figure 8:
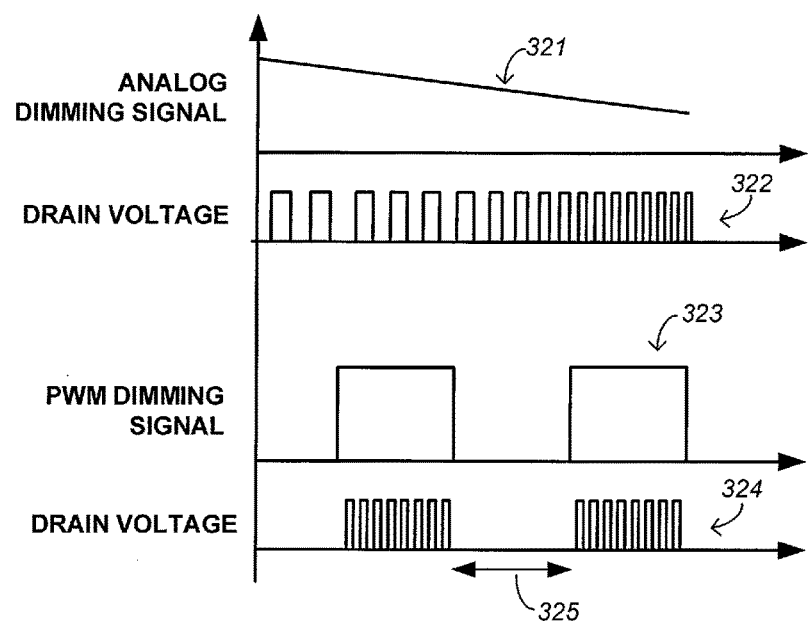
FIG. 8 shows waveforms of signals of the lighting circuit of FIG. 7 in accordance with an embodiment of the present invention.

FIG. 8 shows waveforms of signals of the lighting circuit 300 in accordance with an embodiment of the present invention. FIG. 8 shows, from top to bottom, an analog dimming signal (see 321), the drain voltage at the drain of the transistor Q2 when the dimming signal is an analog dimming signal (see 322), a PWM dimming signal (see 323), and the drain voltage at the drain of the transistor Q2 when the dimming signal is a PWM dimming signal (see 324).

Referring to FIGS. 7 and 8, when the dimming signal at the node 301 is an analog dimming signal, the transistor Q2 is turned on and off so that the pulses at its drain gets closer as the analog dimming signal decreases. This is because the adaptive reference circuit 315 generates the reference signal to follow the dimming signal. Accordingly, as the dimming signal decreases, the reference signal decreases, and the LED current ILED hits the high and low reference thresholds of the reference signal faster. When the dimming signal is an analog dimming signal, the high and low reference thresholds change in linear fashion, and the current ILED will also change in linear fashion.

When the dimming signal at the node 301 is a PWM dimming signal, the transistor Q2 is turned on and off when the PWM dimming signal pulse is asserted (high in this example), and the transistor Q2 is maintained off when the PWM dimming signal pulse is de-asserted (low in this example). In one embodiment, the transistor Q2 is prevented from being turned on when the dimming signal is below a minimum level. This advantageously allows the off interval (see 325) of PWM dimming signal pulses to be implemented. When the dimming signal is a PWM dimming signal, the high and low reference thresholds also change with the PWM dimming signal, and the current ILED will also change accordingly, i.e., high and low. In that case, the average of the current ILED will be dictated by the peak of the current ILED and the duty cycle of the PWM dimming signal.

Figure 9:
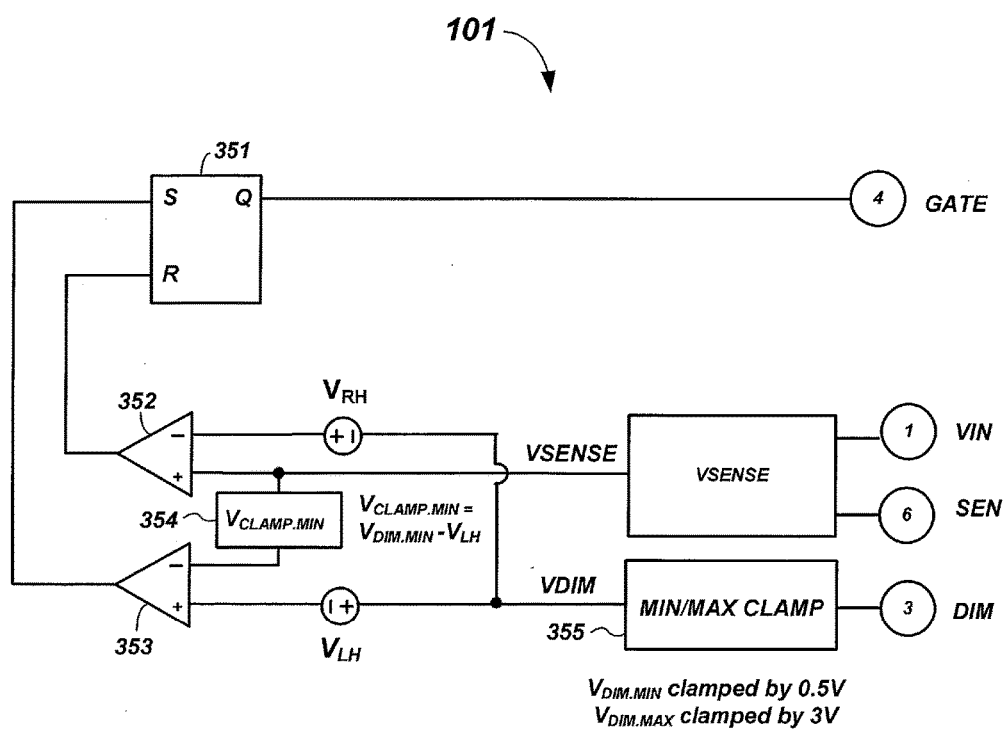
FIG. 9 shows a schematic diagram of a controller IC in accordance with an embodiment of the present invention.

FIG. 9 shows a schematic diagram of the controller IC 101 of the lighting circuit 100 (see FIG. 1) in accordance with an embodiment of the present invention. Driver and other circuits not necessary understanding of the present invention are not shown in FIG. 9.

In the example of FIG. 9, an SR latch 351 generates the gate drive signal that is output to the gate of the transistor Q2 on the gate pin 4 of the controller IC 101. The Q output of the SR latch 351 is asserted (e.g., high) when the S (set)

input is asserted, and the Q output is de-asserted (e.g., low) when the R (reset) input is asserted. In the example of FIG. 9, a sense voltage VSENSE is detected across the input voltage pin 1 and sense pin 6 by high-side current sensing (see resistor RSENSE in FIG. 1). The dimming signal is received on the dimming pin 3 and is provided as the dimming voltage VDIM. In one embodiment, a clamp circuit 355 limits the minimum and the maximum of the dimming voltage VDIM, such that, for example, the minimum dimming voltage VDIM.MIN is clamped to 0.5V and the maximum dimming voltage VDIM.MAX is clamped to 3V. An internal low reference threshold voltage VLH and an internal high reference threshold voltage VRH are generated from the dimming voltage VDIM. In one embodiment, the low reference voltage VLH and high reference voltage VRH follow the dimming voltage VDIM. The difference between the low reference threshold voltage VLH and the high reference threshold voltage VRH provides hysteretic control.

Figure 10:
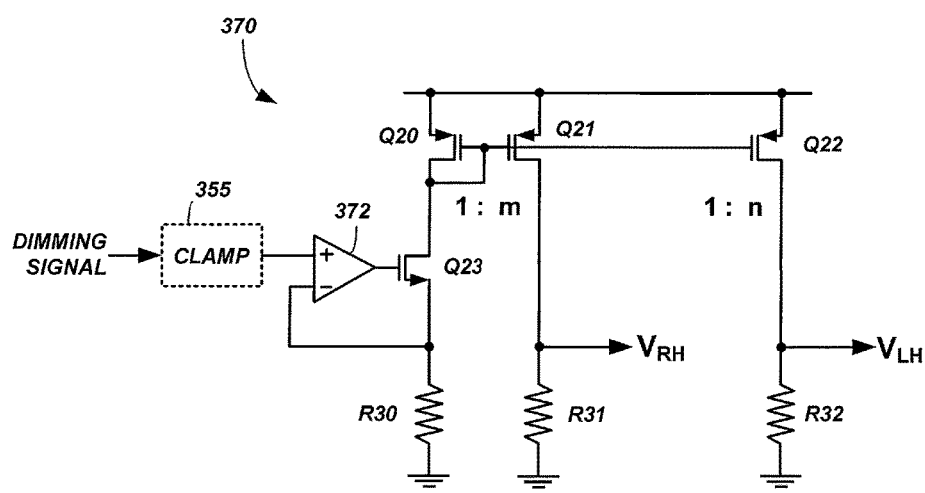
FIG. 10 shows a reference generator in accordance with an embodiment of the present invention.

FIG. 10 shows a reference generator 370 in accordance with an embodiment of the present invention. The reference generator 370 may be incorporated in the controller IC 101. In the example of FIG. 10, the voltage of the dimming signal is clamped by the clamp circuit 355 to minimum and maximum values. The clamp circuit 355 is shown in FIG. 10 with a dotted line because the clamp circuit 355 is not included in some embodiments. A linear regulator formed by the amplifier 372, transistor Q23, and resistor R30 generates a current through the transistor Q20. The transistor Q20 forms a current mirror with the transistors Q21 and Q22 to mirror the current of the dimming signal. A mirrored current from the transistor Q21 flow to the resistor R31 to generate the high reference threshold voltage VRH, and a mirrored current from the transistor Q22 flow to the resistor R32 to generate the low reference threshold voltage VLH. The mirroring allows the high reference threshold voltage VRH and the low reference threshold voltage VLH to follow the dimming signal. The size ratios of the transistors Q20, Q21, and Q22 dictate the mirrored currents and thus the hysteresis between the high reference threshold voltage VRH and the low reference threshold voltage VLH.

Figure 11:
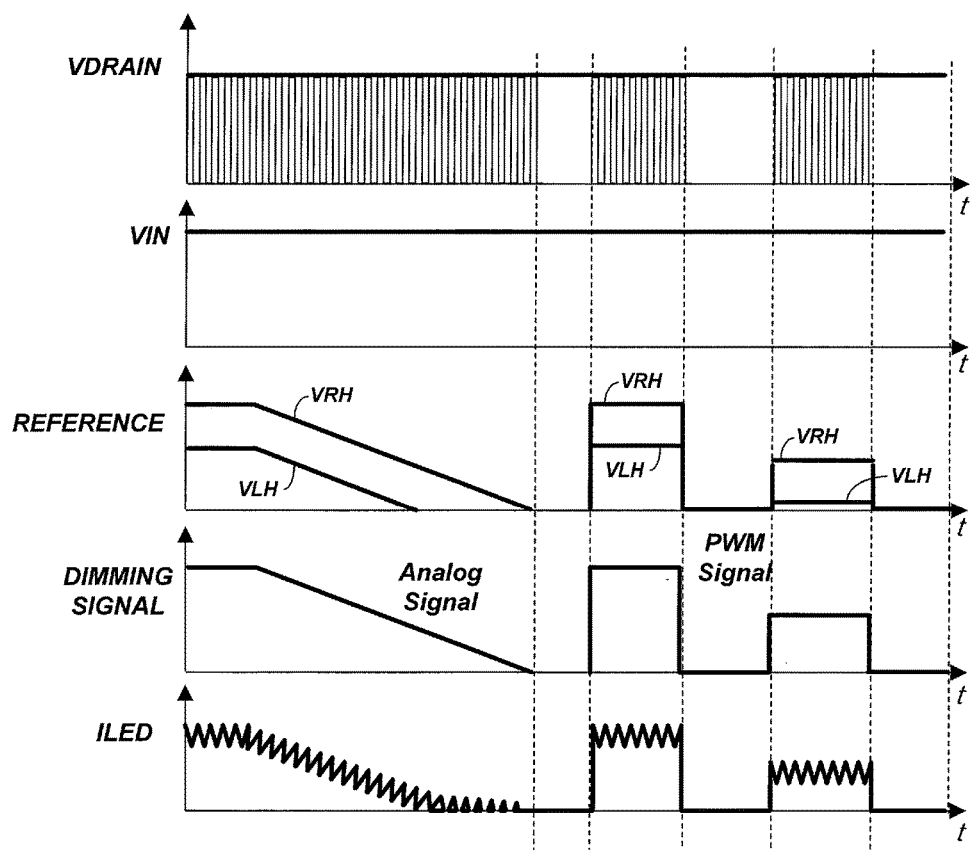
FIG. 11 shows waveforms of signals of the lighting controller IC of FIG. 9 in the lighting circuit of FIG. 1 in accordance with an embodiment of the present invention.

FIG. 11 shows waveforms of signals of the lighting controller IC 101 of FIG. 9 in the lighting circuit of FIG. 1 in accordance with an embodiment of the present invention. FIG. 11 shows, from top to bottom, the drain voltage on the drain of the transistor Q2, the input voltage VIN, the internal reference voltage for hysteretic control, the dimming signal at the dimming pin 3 of the controller IC 101, and the current ILED through the LEDs 102. The internal reference voltage comprises the high reference threshold voltage VRH and the low reference threshold voltage VLH. As shown in FIG. 11, the high reference threshold voltage VRH and the low reference threshold voltage VLH follow the dimming signal input. The high reference threshold voltage VRH and the low reference threshold voltage VLH are analog reference voltages with the same shape as the dimming signal when the dimming signal is an analog dimming signal, and are PWM reference voltages with the same shape as the dimming signal when the dimming signal is a PWM dimming signal. The current ILED also follows the dimming signal.

Continuing with FIG. 9, in accordance with hysteretic control, a comparator 352 compares the sense voltage VSENSE to the high reference threshold voltage VRH to detect when to turn off the transistor Q2 by resetting the SR latch 351, and a comparator 353 compares the sense voltage VSENSE to the low reference threshold voltage VLH to detect when to turn on the transistor Q2 by setting the SR latch 351.

In the example of FIG. 9, a clamp circuit 354 provides a minimum clamp voltage across the positive (+) input of the comparator 352 and the negative (−) input of the comparator 353 to prevent setting of the SR latch 351, and thereby prevent turning on the transistor Q2, when the dimming signal is below the minimum dimming voltage VDIM.MIN. More particularly, in one embodiment, the minimum clamp voltage (VCLAMP.MIN) is given by, $$VCLAMP.MIN = VDIM.MIN - VLH \quad (\text{EQ. 1})$$

When the dimming voltage VDIM is greater than the minimum dimming voltage VDIM.MIN, the sense voltage VSENSE is not clamped and behaves as normal. However, when the dimming voltage VDIM is less than the minimum dimming voltage VDIM.MIN, the sense voltage VSENSE is clamped to the minimum clamp voltage. This prevents the sense voltage VSENSE from becoming lower than the low reference threshold voltage VLH, thereby preventing the comparator 353 from setting the SR latch 351 and turning on the transistor Q2. This allows the off interval of the PWM dimming control to be implemented.

Figure 12:
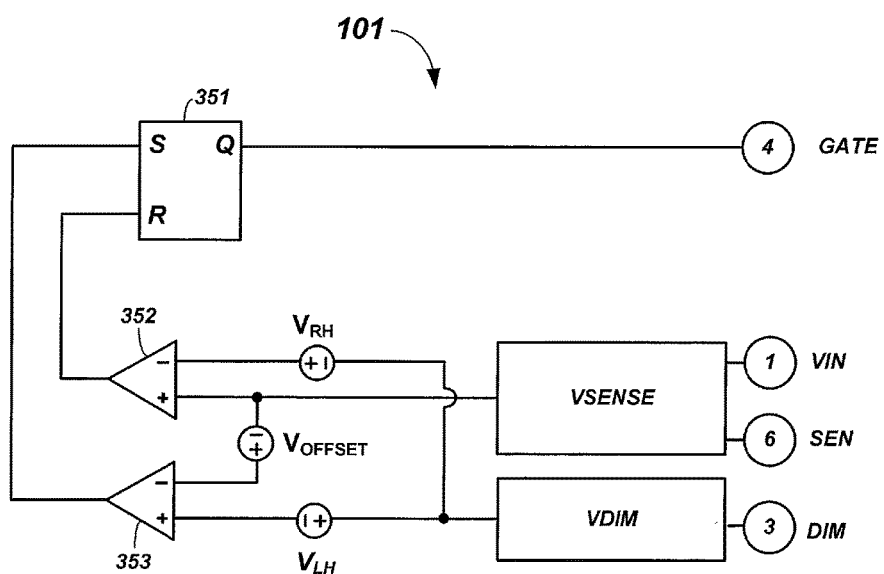
FIG. 12 shows a schematic diagram of a controller IC in accordance with an embodiment of the present invention.

FIG. 12 shows a schematic diagram of the controller IC 101 in accordance with an embodiment of the present invention. Driver and other circuits not necessary understanding of the present invention are not shown in FIG. 12.

In the example of FIG. 12, the SR latch 351 generates the gate drive signal that is output to the gate of the transistor Q2 on the gate pin 4 of the controller IC 101. The Q output of the SR latch 351 is asserted when the S (set) input is asserted, and the Q output is de-asserted when the R (reset) input is asserted. In the example of FIG. 12, a sense voltage VSENSE is detected across the input voltage pin 1 and the sense pin 6 by high-side current sensing. The dimming signal is received on the dimming pin 3 and is provided as the dimming voltage VDIM. An internal low reference threshold voltage VLH and an internal high reference threshold voltage VRH are generated from the dimming voltage VDIM as previously described, except that the dimming voltage VDIM is not clamped to minimum and maximum levels.

In accordance with hysteretic control, the comparator 352 compares the sense voltage VSENSE to the high reference threshold voltage VRH to detect when to turn off the transistor Q2 by resetting the SR latch 351, and the comparator 353 compares the sense voltage VSENSE to the low reference threshold voltage VLH to detect when to turn on the transistor Q2 by setting the SR latch 351.

In the example of FIG. 12, an offset voltage VOFFSET is across the positive (+) input of the comparator 352 and the negative (−) input of the comparator 353. The offset voltage VOFFSET is not applied to the comparator 352, and therefore does not affect operation when the sense voltage VSENSE is compared to the high reference threshold voltage VRH.

In the example of FIG. 12, the offset voltage VOFFSET adds to the sense voltage VSENSE as seen by the comparator 353. Accordingly, when the sense voltage VSENSE has the same level as the low reference threshold voltage VLH, the level of the sense voltage VSENSE would not set the SR latch 351 to turn on the transistor Q2. This allows the transistor Q2 to remain off during the off interval of the PWM dimming control.

Figure 13:
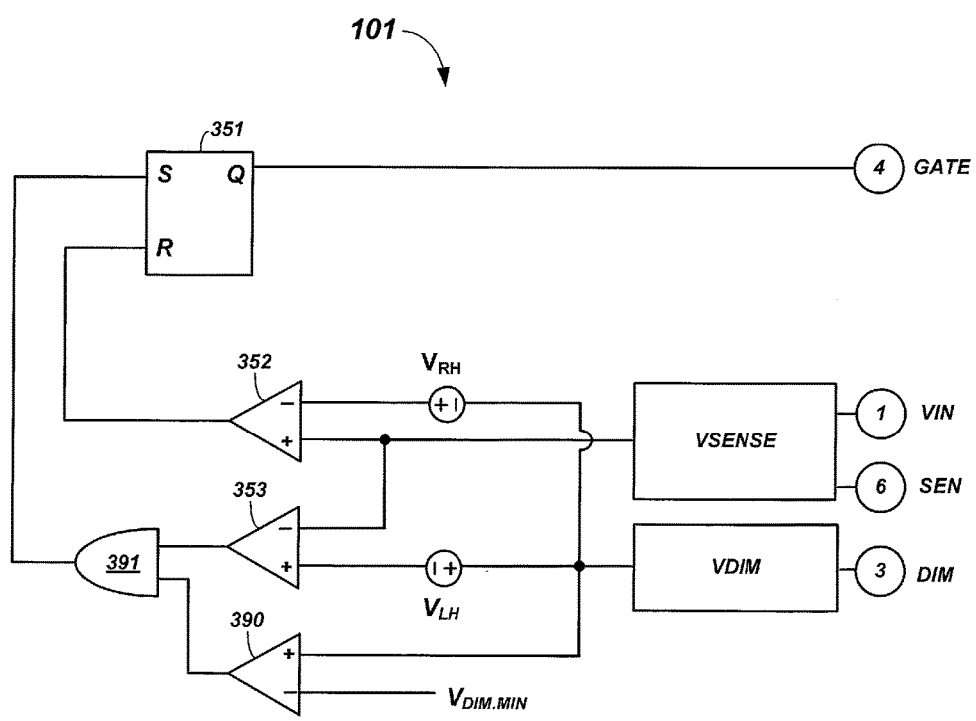
FIG. 13 shows a schematic diagram of a controller IC in accordance with an embodiment of the present invention.

FIG. 13 shows a schematic diagram of the controller IC 101 in accordance with an embodiment of the present invention. Driver and other circuits not necessary understanding of the present invention are not shown in FIG. 13.

In the example of FIG. 13, the SR latch 351 generates the gate drive signal that is output to the gate of the transistor Q2 on the gate pin 4 of the controller IC 101. The Q output of the SR latch 351 is asserted when the S (set) input is asserted, and the Q output is de-asserted when the R (reset) input is asserted. In the example of FIG. 13, a sense voltage VSENSE is detected across the input voltage pin 1 and the sense pin 6 by high-side current sensing. The dimming signal is received on the dimming pin 3 and is provided as the dimming voltage VDIM. An internal low reference threshold voltage VLH and an internal high reference threshold voltage VRH are generated from the dimming voltage VDIM as previously described, except that the dimming voltage VDIM is not clamped to minimum and maximum levels.

In accordance with hysteretic control, the comparator 352 compares the sense voltage VSENSE to the high reference threshold voltage VRH to detect when to turn off the transistor Q2 by resetting the SR latch 351, and the comparator 353 compares the sense voltage VSENSE to the low reference threshold voltage VLH to detect when to turn on the transistor Q2 by setting the SR latch 351.

In the example of FIG. 13, an and gate 391 controls the input to the S (set) input of the SR latch 351. The and gate 391 has an output that is connected to the S (set) input of the SR latch 351, a first input that is connected to an output of the comparator 353, and a second input that is connected to an output of a comparator 390. The comparator 390 compares the dimming voltage VDIM to a minimum dimming voltage VDIM.MIN. The output of the comparator 390 serves as an enable signal for setting the SR latch 351. When the dimming voltage VDIM is less than the minimum dimming voltage VDIM.MIN, the comparator 390 outputs a low to the input of the and gate 391, thereby preventing the SR latch 351 from being set. Accordingly, the transistor Q2 cannot be turned on when dimming voltage VDIM is less than the minimum dimming voltage VDIM.MIN.

Circuits and methods for generating a hybrid dimming signal and performing hybrid dimming control signal have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A lighting circuit comprising:
a light emitting diode (LED);
a first transistor that is configured to control a current through the LED; and
a controller integrated circuit (IC) having a first pin that outputs a drive signal for controlling a switching operation of the first transistor and a second pin that receives a dimming signal, the controller IC integrated circuit being configured to adjust a brightness of the LED by controlling the first transistor based on the dimming signal; and
a dimming input circuit that receives a first pulse width modulation (PWM) dimming signal and a second PWM dimming signal, the dimming input circuit being configured to output the dimming signal as a series of pulses that controls the brightness of the LED in accordance with PWM dimming control when the second PWM dimming signal alternates between a first level and a second level, and to output the dimming signal as an analog signal that controls the brightness of the LED in accordance with analog dimming control when the second PWM dimming signal is at the second level.

2. The lighting circuit of claim 1, wherein the dimming input circuit comprises:
a low-pass filter that is configured to low-pass filter the first PWM dimming signal to generate a filtering signal; and
a second transistor that is configured to present the filtering signal to the second pin of the controller IC when the second PWM dimming signal is at the first level, and to cut off the filtering signal from the second pin when the second PWM dimming signal is at the second level.

3. The lighting circuit of claim 2, wherein the dimming input circuit receives the first and second PWM dimming signals from a microcontroller.

4. The lighting circuit of claim 2, wherein the dimming input circuit further comprises a third transistor, and wherein the second PWM dimming signal controls a switching operation of the third transistor to control a switching operation of the second transistor.

5. The lighting circuit of claim 1, wherein the first transistor comprises a MOS transistor having a drain that is connected to a cathode of the LED, a source that is connected to ground, and a gate that is connected to the first pin of the controller IC.

6. The lighting circuit of claim 5, wherein the drain of the transistor is connected to the cathode of the LED by way of an inductor.

7. The lighting circuit of claim 1, wherein the controller IC further comprises a third pin that receives a sense voltage indicative of the current through the LED.

8. A dimming input circuit comprising:
a first node that is configured to receive a first pulse width modulation (PWM) dimming signal;
a second node that is configured to receive a second PWM dimming signal; and
a third node that is configured to output a dimming signal for adjusting a brightness of a light emitting diode (LED),
wherein the dimming input circuit is configured to generate the dimming signal as a hybrid dimming signal for adjusting the brightness of the LED in accordance with PWM dimming control and in accordance with analog dimming control based on the first and second PWM dimming signals,
wherein the dimming input circuit is configured to generate the dimming signal as the hybrid dimming signal for adjusting the brightness of the LED in accordance with PWM dimming control when the second PWM dimming signal alternates between a first level and a second level.

9. The dimming input circuit of claim 8, wherein the dimming input circuit is configured to generate the dimming signal as the hybrid dimming signal for adjusting the brightness of the LED in accordance with analog dimming control when the second PWM dimming signal is maintained at the second level.

10. The dimming input circuit of claim 8, wherein the first node is configured to receive the first PWM dimming signal from a microcontroller, and the second node is configured to receive the second PWM dimming signal from the microcontroller.

11. The dimming input circuit of claim 8, wherein the third node is configured to be connected to a dimming pin of a controller integrated circuit (IC) for controlling the brightness of the LED.

12. A method of operating a lighting circuit, the method to be performed by a dimming input circuit, the method comprising:
    receiving a first pulse width modulation (PWM) dimming signal;
    receiving a second PWM dimming signal;
    low-pass filtering the first PWM dimming signal to generate a filtering signal;
    generating a hybrid dimming signal based on the first and second PWM dimming signals by providing the filtering signal as the hybrid dimming signal based on the second PWM dimming signal; and
    adjusting a brightness of a light emitting diode (LED) of the lighting circuit in accordance with the hybrid dimming signal.

13. The method of claim 12, further comprising:
    preventing the filtering signal from being provided as the hybrid dimming signal based on the second PWM dimming signal.

14. The method of claim 12, further comprising:
    receiving the first and second PWM dimming signals from a microcontroller.

15. The method of claim 12, further comprising:
    generating the hybrid dimming signal as a series of PWM pulses when the second PWM signal alternates between at a first level and a second level; and
    generating the hybrid dimming signal as an analog dimming signal when the second PWM signal is maintained at the second level.

16. A dimming input circuit comprising:
    a first node that is configured to receive a first pulse width modulation (PWM) dimming signal;
    a second node that is configured to receive a second PWM dimming signal; and
    a third node that is configured to output a dimming signal for adjusting a brightness of a light emitting diode (LED),
    wherein the dimming input circuit is configured to generate the dimming signal as a hybrid dimming signal for adjusting the brightness of the LED in accordance with PWM dimming control and in accordance with analog dimming control based on the first and second PWM dimming signals,
    wherein the dimming input circuit further comprises:
    a low-pass filter that is configured to low-pass filter the first PWM dimming signal to generate a filtering signal; and
    a first transistor that is configured to connect an output terminal of the low-pass filter to the third node and to generate the dimming signal based on the second PWM dimming signal.

17. The dimming input circuit of claim 16, wherein the dimming input circuit further comprises:
    a second transistor that is configured to control a switching operation of the first transistor based on the second PWM dimming signal.

18. The dimming input circuit of claim 16, wherein the second PWM dimming signal turns on the first transistor to connect the filtering signal to the third node when the second PWM dimming signal is at a first level, and turns off the first transistor to cut off the filtering signal from the third node when the second PWM dimming signal is at a second level.

\* \* \* \* \*